(12) United States Patent
Takahashi et al.

(10) Patent No.: US 11,094,344 B2
(45) Date of Patent: *Aug. 17, 2021

(54) HARD DISK DRIVE WITH MAGNETIC-DISK SUBSTRATE

(71) Applicant: HOYA CORPORATION, Tokyo (JP)

(72) Inventors: Takeyoshi Takahashi, Akishima (JP); Masaaki Ueda, Yokohama (JP)

(73) Assignee: HOYA CORPORATION, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 16/368,165

(22) Filed: Mar. 28, 2019

(65) Prior Publication Data
US 2019/0221233 A1     Jul. 18, 2019

Related U.S. Application Data

(63) Continuation of application No. 15/420,502, filed on Jan. 31, 2017, now Pat. No. 10,290,315, which is a
(Continued)

(30) Foreign Application Priority Data

Sep. 28, 2012   (JP) .................................. 2012-218706

(51) Int. Cl.
   *G11B 5/82*      (2006.01)
   *G11B 5/73*      (2006.01)

(52) U.S. Cl.
   CPC ............ *G11B 5/82* (2013.01); *G11B 5/73921* (2019.05)

(58) Field of Classification Search
   None
   See application file for complete search history.

(56) References Cited

U.S. PATENT DOCUMENTS

| 6,217,971 B1 | 4/2001 | Wolff et al. |
| 6,808,784 B2 | 10/2004 | Hashimoto et al. |
| (Continued) | | |

FOREIGN PATENT DOCUMENTS

| CN | 1385833 A | 12/2002 |
| CN | 101010734 A | 8/2007 |
| (Continued) | | |

OTHER PUBLICATIONS

International Search Report in PCT/JP2013/076614 dated Dec. 17, 2013.
(Continued)

*Primary Examiner* — Kevin M Bernatz
(74) *Attorney, Agent, or Firm* — Global IP Counselors, LLP (57) ABSTRACT

A hard disk drive includes a doughnut-shaped magnetic-disk substrate having a circular hole provided in the center. The doughnut-shaped magnetic-disk substrate includes a pair of main surfaces, and an outer circumferential end surface and an inner circumferential end surface each including a side wall surface and a chamfered surface that is formed between each main surface and the side wall surface. A measurement point is provided on the outer circumferential end surface every 30 degrees in the circumferential direction with reference to a center of the substrate, and when a curvature radius of a shape of a portion between the side wall surface and the chamfered surface is determined at each measurement point, a difference in the curvature radius between neighboring measurement points is 0.01 mm or less.

20 Claims, 4 Drawing Sheets

Related U.S. Application Data continuation of application No. 14/432,186, filed as application No. PCT/JP2013/076614 on Sep. 30, 2013, now Pat. No. 9,583,128.

(56) References Cited

U.S. PATENT DOCUMENTS

| | | | |
|---|---|---|---|
| 7,662,493 | B2 | 2/2010 | Machida et al. |
| 8,241,768 | B2 | 8/2012 | Takizawa et al. |
| 9,583,128 | B2 * | 2/2017 | Takahashi ............... G11B 5/82 |
| 10,290,315 | B2 * | 5/2019 | Takahashi ............... G11B 5/73 |
| 10,431,252 | B2 * | 10/2019 | Tamaki .................... G11B 5/73 |
| 10,535,366 | B2 * | 1/2020 | Tamaki .................... G11B 5/73 |
| 10,553,243 | B2 * | 2/2020 | Tamaki .................... G11B 5/82 |
| 2007/0196699 | A1 | 8/2007 | Aida |
| 2009/0142626 | A1 | 6/2009 | Orita et al. |
| 2010/0040907 | A1 | 2/2010 | Takizawa et al. |
| 2010/0247977 | A1 | 9/2010 | Tsuchiya et al. |
| 2010/0285726 | A1 | 11/2010 | Ueda et al. |

FOREIGN PATENT DOCUMENTS

| | | |
|---|---|---|
| CN | 101611444 A | 12/2009 |
| CN | 101853670 A | 10/2010 |
| JP | 2000-143279 A | 5/2000 |
| JP | 2002-100031 A | 4/2002 |
| JP | 2006-99945 A | 4/2006 |
| JP | 2007-042263 A | 2/2007 |
| JP | 2008-094982 A | 4/2008 |
| JP | 2008-226376 A | 9/2008 |
| JP | 2009-064524 A | 3/2009 |
| JP | 2009-134802 A | 6/2009 |
| JP | 2009-151881 A | 7/2009 |
| JP | 2009-157968 A | 7/2009 |
| JP | 2010-257562 A | 11/2010 |
| JP | 4994213 B2 | 8/2012 |
| WO | 2008102751 A1 | 8/2008 |

OTHER PUBLICATIONS

Japanese Version of Office Action in the corresponding Chinese Patent Application No. 201380044545.6 dated Oct. 10, 2015.
Written Opinion translated into Japanese in the corresponding Chinese Patent Application No. 201610412698.7, dated May 3, 2018.

* cited by examiner

ENLARGED CROSS-SECTIONAL VIEW TAKEN ALONG LINE X-X

HARD DISK DRIVE WITH MAGNETIC-DISK SUBSTRATE

CROSS-REFERENCE TO RELATED APPLICATIONS

This is a continuation of U.S. patent application Ser. No. 15/420,502, filed on Jan. 31, 2017, now U.S. Pat. No. 10,290,315, which is a continuation application of U.S. patent application Ser. No. 14/432,186, filed on Mar. 27, 2015, now U.S. Pat. No. 9,583,128, which is a U.S. National Stage Application of International Application No. PCT/JP2013/076614, filed Sep. 30, 2013, which, in turn, claims priority under 35 U.S.C. § 119(a) to Japanese Patent Application No. 2012-218706, filed in Japan on Sep. 28, 2012, the entire contents of U.S. patent application Ser. Nos. 14/432,186 and 15/420,502, International Application No. PCT/JP2013/076614 and Japanese Patent Application No. 2012-218706 are hereby incorporated herein by reference.

BACKGROUND

Field of the Invention

The present invention relates to a magnetic-disk glass substrate and a magnetic disk.

Background Information

Nowadays, personal computers, digital versatile disc (DVD) recorders, and the like have a built-in hard disk drive (HDD) for data recording. In particular, a magnetic disk in which a magnetic layer is provided on a glass substrate is used in a hard disk drive that is used in a device premised on portability, such as a notebook-type personal computer, and magnetic recording information is recorded on or read from the magnetic layer with a magnetic head that flies slightly above the surface of the magnetic disk. At this time, the rotation rate of the magnetic disk is about 5400 rpm, for example. A glass substrate having a higher rigidity and a higher impact resistance than a metal substrate (aluminum substrate) or the like has is preferably used as a substrate of the magnetic disk. It should be noted that the magnetic-disk glass substrate generally has a thickness of 0.635 mm or 0.8 mm in a 2.5-inch magnetic disk, for example.

In recent years, there have been calls for a magnetic-disk for use in a stationary server device such as a network server device that is rotated at a higher rotation speed in order to further improve the access time and the transfer rate. In the case where a magnetic disk is rotated at a higher rotation speed than previously, a conventional magnetic-disk aluminum substrate does not have enough rigidity even if the thickness is increased, and therefore, fluttering occurs. Here, fluttering is a phenomenon in which a substrate vibrates (flutters) due to the rotation of the substrate. Therefore, JP 2008-226376A discloses a magnetic-disk glass substrate in which ΔS that is a difference between a maximum value Smax and minimum value Smin of the gap S between the inner circumference and the outer circumference of a projection image projected on a plane parallel with a main surface is set to less than 2 μm in order to reduce fluttering at a high rotation speed.

SUMMARY

In a conventional magnetic-disk glass substrate, the difference between the maximum value and the minimum value of the gap between the inner circumference and the outer circumference of a main surface is prescribed. However, it was confirmed that when a magnetic disk is rotated at a high rotation speed, fluttering sometimes occurs due to the shape of the end surface of the glass substrate.

Therefore, it is an object of the present invention to provide a magnetic-disk glass substrate and a magnetic disk capable of further reducing fluttering at a high rotation speed.

As a result of intensive research by the inventors of the present invention to further reduce fluttering at a high rotation speed, it was found that it is possible to further reduce fluttering by reducing the change in the shape of the outer circumferential end surface (including a side wall surface orthogonal to main surfaces and chamfered surfaces between the main surfaces and the side wall surface) of the glass substrate in the circumferential direction.

The inventors of the present invention consider the reason for this to be as follows. That is, it is thought that when there is a large change in the shape of the outer circumferential end surface in the circumferential direction of the glass substrate during a short cycle, the amount of air that comes into contact with the outer circumferential end surface changes significantly, and thus the airflow around the outer circumferential end surface caused by the rotation of the substrate is destabilized. Moreover, some recent magnetic-disk drive devices are provided with a wall (shroud) for covering the outer circumference of the magnetic disk that is attached to a spindle, and by reducing the gap between the wall and the outer circumferential end surface of the magnetic disk, it is possible to stabilize the airflow. However, it is thought that when the change in the shape of the outer circumferential end surface in the circumferential direction of the glass substrate becomes large in a state in which the gap is small, the rate of the change in the gap between the wall and the outer circumferential end surface of the magnetic disk increases, and thus the airflow in the gap is likely to be disturbed. Accordingly, by reducing the change in the shape of the outer circumferential end surface in the circumferential direction of the glass substrate, it is possible to stabilize the airflow around the outer circumferential end surface of the glass substrate and to keep the gap between the wall and the outer circumferential end surface of the magnetic disk substantially constant, thus making it possible to further reduce fluttering.

According to a first aspect of the present invention, a hard disk drive comprises a doughnut-shaped magnetic-disk substrate having a circular hole provided in the center. The doughnut-shaped magnetic-disk substrate includes a pair of main surfaces, and an outer circumferential end surface and an inner circumferential end surface each including a side wall surface and a chamfered surface that is formed between each main surface and the side wall surface. A measurement point is provided on the outer circumferential end surface every 30 degrees in the circumferential direction with reference to a center of the substrate, and when a curvature radius of a shape of a portion between the side wall surface and the chamfered surface is determined at each measurement point, a difference in the curvature radius between neighboring measurement points is 0.01 mm or less.

A second aspect of the present invention, a hard disk drive comprises a magnetic-disk substrate having a circular hole provided in the center. The magnetic-disk substrate includes a pair of main surfaces that includes a surface A and a surface B, and an outer circumferential end surface and an inner circumferential end surface each including a side wall surface and a chamfered surface that is formed between each main surface and the side wall surface. A measurement point is provided on the outer circumferential end surface every 30 degrees in the circumferential direction with reference to a center of the main surfaces of the magnetic-disk substrate, and when average values of difference in curvature radius of a shape of a portion between the side wall surface and the chamfered surface between neighboring measurement points are determined for the surface A and the surface B and a difference between the average value of the surface A and the average value of the surface B is obtained in an absolute value as ΔR, the ΔR is 0.003 mm or less.

DESCRIPTION OF EMBODIMENTS

Hereinafter, a magnetic-disk glass substrate and a magnetic disk of this embodiment will be described in detail.
[Magnetic-Disk Glass Substrate]
Aluminosilicate glass, soda-lime glass, borosilicate glass, or the like can be used as a material for a magnetic-disk glass substrate of this embodiment. In particular, aluminosilicate glass can be preferably used because it can be chemically strengthened and be used to produce a magnetic-disk glass substrate having excellent flatness of its main surfaces and excellent strength of the substrate. Amorphous aluminosilicate glass is more preferable.
Although there is no limitation on the composition of the magnetic-disk glass substrate of this embodiment, the glass substrate of this embodiment is amorphous aluminosilicate glass that preferably contains, in terms of oxide amount in mol %, $SiO_2$ in an amount of 50 to 75%, $Al_2O_3$ in an amount of 1 to 15%, at least one component selected from $Li_2O$, $Na_2O$ and $K_2O$ in a total amount of 5 to 35%, at least one component selected from MgO, CaO, SrO, BaO and ZnO in a total amount of 0 to 20%, and at least one component selected from $ZrO_2$, $TiO_2$, $La_2O_3$, $Y_2O_3$, $Ta_2O_5$, $Nb_2O_5$ and $HfO_2$ in a total amount of 0 to 10% (this composition is referred to as "glass composition 1" hereinafter).
Also, the glass substrate of this embodiment may be amorphous aluminosilicate glass that preferably contains, as disclosed in JP 2009-99239A for example, in mass %, $SiO_2$ in an amount of 57 to 75%, $Al_2O_3$ in an amount of 5 to 20% (it should be noted that the total amount of $SiO_2$ and $Al_2O_3$ is 74% or more), $ZrO_2$, $HfO_2$, $Nb_2O_5$, $Ta_2O_5$, $La_2O_3$, $Y_2O_3$ and $TiO_2$ in a total amount of more than 0% to 6% or less, $Li_2O$ in an amount of more than 1% to 9% or less, $Na_2O$ in an amount of 5 to 18% (it should be noted that a mass ratio $Li_2O/Na_2O$ is 0.5 or less), $K_2O$ in an amount of 0 to 6%, MgO in an amount of 0 to 4%, CaO in an amount of more than 0% to 5% or less (it should be noted that the total amount of MgO and CaO is 5% or less and the content of CaO is larger than that of MgO), and SrO+BaO in an amount of 0 to 3%.

As disclosed in Japanese Patent No. 4815002, for example, the glass substrate of this embodiment may be crystallized glass that contains, in terms of oxide amount in mass %, $SiO_2$ in an amount of 45.60 to 60%, $Al_2O_3$ in an amount of 7 to 20%, $B_2O_3$ in an amount of 1.00 to 8% or less, $P_2O_5$ in an amount of 0.50 to 7%, $TiO_2$ in an amount of 1 to 15%, and RO (it should be noted that R represents Zn and Mg) in a total amount of 5 to 35%, CaO in an amount of 3.00% or less, BaO in an amount of 4% or less, no PbO component, no $As_2O_3$ component, no $Sb_2O_3$ component, no component, no $NO^-$ component, no $SO^{2-}$ component, no F component, and one or more selected from $RAl_2O_4$ and $R_2TiO_4$ (it should be noted that R represents one or more selected from Zn and Mg) as a main crystal phase, and in which the particle size of crystals in the main crystal phase is within a range of 0.5 nm to 20 nm, the degree of crystallization is 15% or less, and the specific gravity is 2.95 or less.

The composition of the magnetic-disk glass substrate of this embodiment may include $SiO_2$, $Li_2O$ and $Na_2O$, and one or more alkaline earth metal oxides selected from the group consisting of MgO, CaO, SrO and BaO as essential components, the molar ratio of the content of CaO to the total content of MgO, CaO, SrO and BaO (CaO/(MgO+CaO+SrO+BaO)) may be 0.20 or less, and the glass-transition temperature may be 650° C. or higher. The magnetic-disk glass substrate having such a composition is preferably for a magnetic-disk glass substrate to be used in a magnetic disk for energy-assisted magnetic recording (this composition is referred to as "glass composition 2" hereinafter).

Figure 1A:
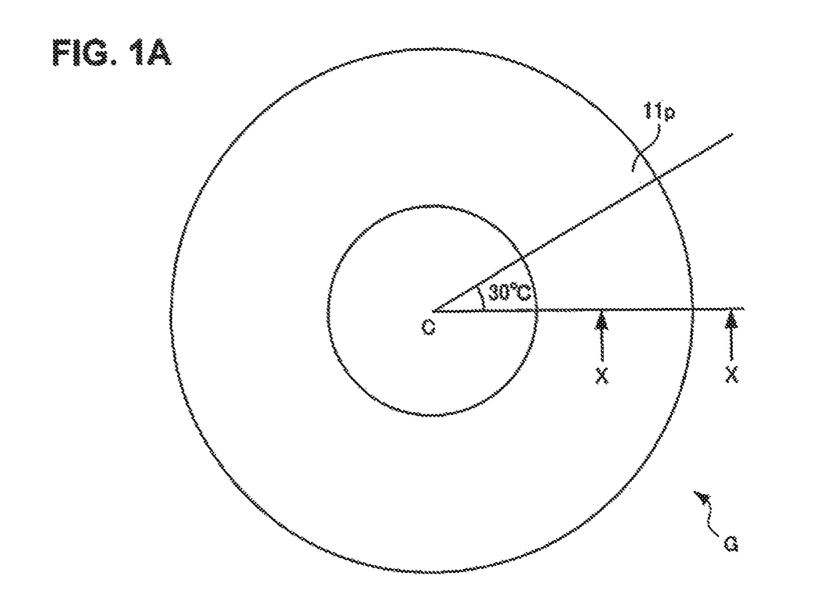
FIG. 1A is a plan view of a magnetic-disk glass substrate according to an embodiment.
Figure 1B:
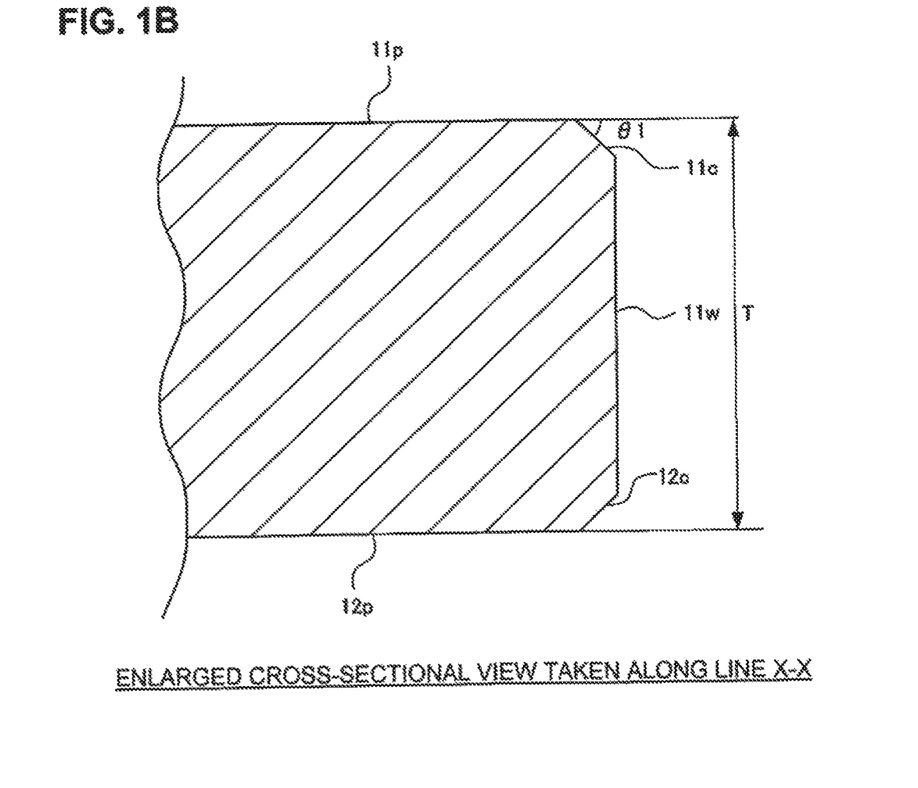
FIG. 1B is an enlarged cross-sectional view taken along line X-X shown in FIG. 1A.
Figure 1C:
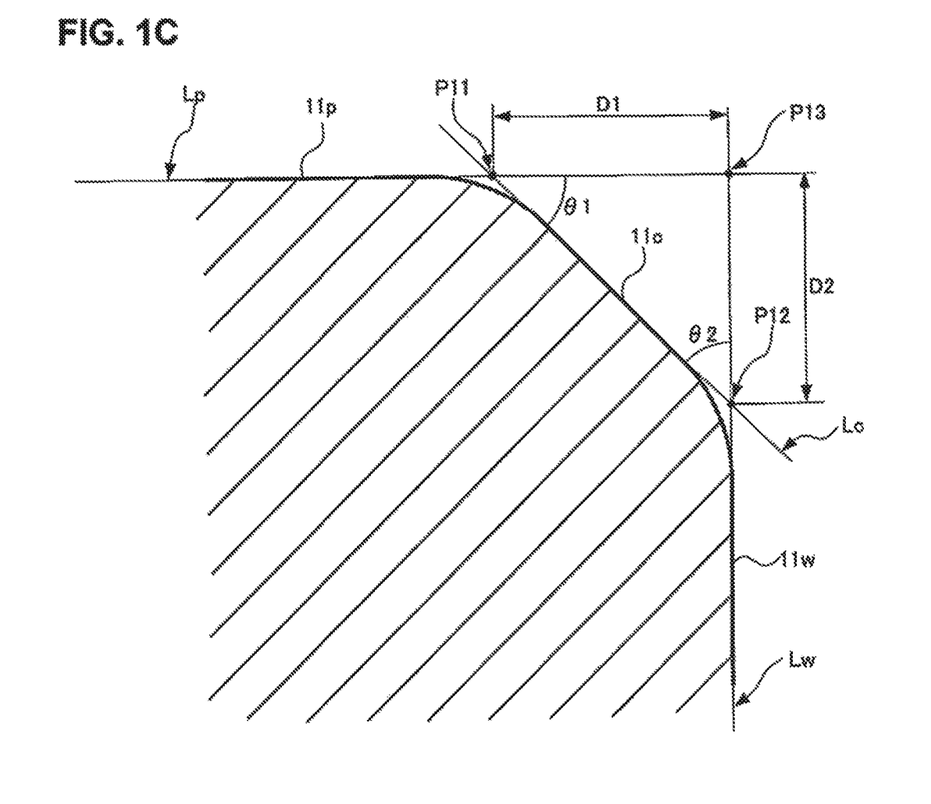
FIG. 1C is a further enlarged view of a portion of FIG. TB.
Figure 2:
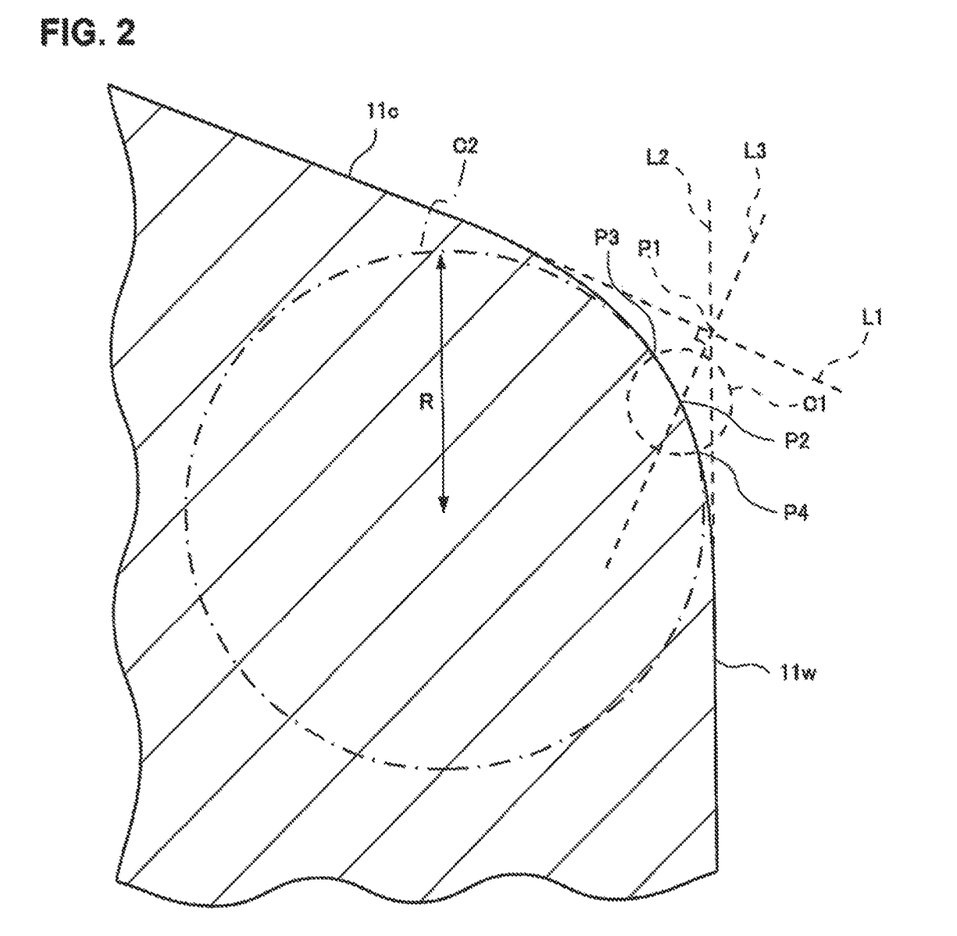
FIG. 2 is an enlarged view of main portions of FIG. 1B.

FIGS. 1A to 1C and FIG. 2 show the shape of a magnetic-disk glass substrate G of this embodiment. FIG. 1A is a plan view of the magnetic-disk glass substrate of this embodiment. FIG. 1B is an enlarged cross-sectional view taken along line X-X shown in FIG. 1A. FIG. 1C is a further enlarged view of a portion of FIG. 1B. FIG. 2 is an enlarged view of main portions of FIG. 1B. Here, it should be noted that there is no need to actually cut the substrate in order to check the shape of the cross section, and it is sufficient to measure the shape of the cross section using a contour shape measuring machine. Specifically, for example, it is sufficient to fix the glass substrate such that the chamfered surface on the outer circumferential side is substantially horizontal, and to move the fixed glass substrate or a stylus of the contour shape measuring machine in the radial direction of the glass substrate.

As shown in FIG. 1A, the magnetic-disk glass substrate G of this embodiment has a doughnut shape that is provided with a circular inner hole in the center thereof and has an annular contour. As shown in FIG. 1B, the magnetic-disk glass substrate G of this embodiment has a pair of main surfaces 11p and 12p and two side wall surfaces, which are a side wall surface on the inner circumferential side (that is, a side wall surface of the circular hole) and a side wall surface on the outer circumferential side (that is, a side wall surface of the contour). In FIG. 1B, the side wall surface 11w of the glass substrate G is the side wall surface on the outer circumferential side. It is preferable that the side wall surface 11w on the outer circumferential side of the glass substrate G includes a surface orthogonal to each of the two of main surfaces 11p and 12p. Chamfered surfaces 11c and 12c are respectively formed between the pair of main surfaces 11p and 12p and the side wall surface 11w on the outer circumferential side. Here, although FIG. 1B shows the case where the chamfered surfaces 11c and 12c are formed in a plane shape as an example, the chamfered surfaces 11c and 12c may be formed so as to include a surface curved outward from the glass substrate G. In this case, it is preferable that the degree of the curvature is substantially constant in the circumferential direction of the glass substrate G.

The shape of the end portion on the outer circumferential side of the magnetic-disk glass substrate G of this embodiment will be described with reference to FIG. 1C. In FIG. 1C, the linear portions of the main surface 11p, the side wall surface 11w, and the chamfered surface 11c are expressed as Lp, Lw, and Lc, respectively. In addition, in FIG. 1C, the intersection of the linear portion Lp of the main surface 11p and the linear portion Lc of the chamfered surface 11c is given as P11, the intersection of the linear portion Lw of the side wall surface 11w and the linear portion Lc of the chamfered surface 11c is given as P12, and the intersection of the linear portion Lp of the main surface 11p and the linear portion Lw of the side wall surface 11w is given as P13.

It is preferable that the angle formed by the linear portion Lp of the main surface 11p and the linear portion Lc of the chamfered surface 11c (chamfering angle: θ1) is, for example, 40 to 70 degrees. It is preferable that the angle formed by the linear portion Lw of the linear portion surface 11w and the linear portion Lc of the chamfered surface 11c (chamfering angle: θ2) is, for example, 20 to 50 degrees. Also, it is preferable that a distance D1 between the point P11 and the point P13 is set to 0.05 to 0.20 mm and a distance D2 between the point P12 and the point P13 is set to 0.10 to 0.30 mm. By forming the shape within the above-described ranges, it is possible to prevent problems such as chipping of the outer circumferential end portion and dropping of the substrate, even when the outer circumferential end portion is held in an inspection step, a film forming step, a HDD assembling step, and the like after finishing the manufacture of the glass substrate.

It should be noted that while the end portion near one main surface on the outer circumferential side of the magnetic-disk glass substrate has been described with reference to FIG. 1C, other end portions (that is, the end portion near the other main surface on the outer circumferential side and the end portions on the inner circumferential side) are formed in the same manner.

In the description below, the side wall surface 11w and the chamfered surfaces 11c and 12c are collectively referred to as the "outer circumferential end surface", and the side wall surface and the chamfered surfaces on the inner circumferential side (not shown) are collectively referred to as the "inner circumferential end surface".

Next, a method for determining the curvature radius of the shape of the portion between the side wall surface 11w and the chamfered surface 11c will be described with reference to FIG. 2. In FIG. 2, R denotes the radius of a circle C2 forming the curvature of the shape of the portion between the side wall surface 11w and the chamfered surface 11c, and the curvature radius of the shape of that portion. It is possible to determine the curvature radius R as follows, for example. First, the intersection of a virtual line L1 obtained by extending the linear portion of the chamfered surface 11c and a virtual line L2 obtained by extending the linear portion of the side wall surface 11w is given as P1. Next, a virtual line L3 is set that passes through the intersection P1 and extends orthogonally with respect to the linear portion of the chamfered surface 11c. Next, the intersection of the portion between the side wall surface 11w and the chamfered surface 11c and the virtual line L3 is given as P2. Moreover, a circle C1 around the intersection P2 that has a predetermined radius (50 μm, for example) is set on the cross section of the glass substrate G. In addition, two intersections of the portion between the side wall surface 11w and the chamfered surface 11c and the circumference of the circle C1 are given as P3 and P4, respectively. Furthermore, a circle C2 is set that passes through the three intersections P2, P3, and P4.

By determining the radius of the circle C2, it is possible to determine the curvature radius R of the shape of the portion between the side wall surface 11w and the chamfered surface 11c.

It should be noted that the curvature radius of the shape of the portion between the side wall surface 11w and the chamfered surface 12c can be determined in the same manner as described above.

In this embodiment, measurement points are provided every 30 degrees in the circumferential direction with reference to a center C of the glass substrate G (see FIG. 1A). That is, there are twelve measurement points. When the curvature radius R of the shape of the portion between the side wall surface 11w and the chamfered surface 11c is determined at each measurement point, the twelve differences (absolute values) in total (twenty-four differences when including the shapes of the portions between the side wall surface 11w and the other chamfered surface of the disk) of the curvature radius R between the neighboring measurement points are each set to 0.01 mm or less. Thus, it is possible to reduce the change in the shape of the outer circumferential end surface in the circumferential direction of the glass substrate G, and therefore, in the case where a magnetic disk produced using this glass substrate G is rotated at a high rotation speed, it is possible to stabilize the airflow around the outer circumferential end surface of the magnetic disk. Moreover, in the case where this magnetic disk is attached to a spindle of a magnetic-disk drive device, it is possible to keep the gap between a wall (shroud) that covers the outer circumference of the magnetic disk and the outer circumferential end surface of the magnetic disk substantially constant, and therefore, it is possible to stabilize the airflow in the gap. Accordingly, with the glass substrate G of this embodiment, it is possible to further reduce fluttering at a high rotation speed. It should be noted that a difference of the curvature radius R between the neighboring measurement points of 0.005 mm or less is preferable because it is possible to further reduce fluttering at a high rotation speed.

It should be noted that the curvature radius of the shape of the portion between the main surface 11p and the chamfered surface 11c (second curvature radius) may be determined in the same manner as described above. Specifically, the intersection of the virtual line L1 obtained by extending the linear portion of the chamfered surface 11c and a virtual line L4 (not shown) obtained by extending the linear portion of the main surface 11p is given as P5 (not shown). Next, a virtual line L5 (not shown) is set that passes through the intersection P5 and extends orthogonally with respect to the main surface 11p. Next, the intersection of the portion between the main surface 11p and the chamfered surface 11c and the virtual line L5 is given as P6 (not shown). Moreover, a circle C3 (not shown) around the intersection P6 that has a predetermined radius (10 μm, for example) is set on the cross section of the glass substrate G. In addition, two intersections of the portion between the main surface 11p and the chamfered surface 11c and the circumference of the circle C3 are given as P7 and P8 (not shown), respectively. Furthermore, a circle C4 (not shown) is set that passes through the three intersections P6, P7, and P8. By determining the radius of the circle C4, it is possible to determine the second curvature radius of the shape of the portion between the main surface 11p and the chamfered surface 11c.

It should be noted that the second curvature radius of the shape of the portion between the main surface 12p and the chamfered surface 12c can be determined in the same manner as described above. For example, when measurement points are provided every 30 degrees in the circumferential direction with reference to the center C of the glass substrate G and the second curvature radius is determined at each measurement point (twelve measurement points), the difference of the second curvature radius between the neighboring measurement points may be set to 0.004 mm or less. Thus, it is possible to further reduce the change in the shape of the outer circumferential end surface (including the portion between the main surface and the chamfered surface) in the circumferential direction of the glass substrate G, and therefore, in the case where a magnetic disk produced using this glass substrate G is rotated at a high rotation rate, it is possible to stabilize the airflow around the outer circumferential end surface of the magnetic disk.

Although there is no limitation on the size of the magnetic-disk glass substrate G of this embodiment, the magnetic-disk glass substrate G may have a nominal diameter of 2.5 inches, for example. The magnetic-disk glass substrate G of this embodiment may be used for, for example, a magnetic disk to be integrated in a magnetic-disk drive device to be mounted in a server device, a notebook-type personal computer, or the like.

Incidentally, in order for a conventional magnetic disk to be rotated at a high rotation speed of, for example, 10000 rpm or more, it was sought to ensure a desired thickness at which no fluttering would occur when the magnetic disk was rotated at such a high rotation speed. On the other hand, in recent years, the size and the thickness of magnetic-disk drive devices have been reduced based on demands for the reduction of the size and the thickness of notebook-type personal computers and the like. As a result, demands for a reduction of the thickness of magnetic disks have increased. Here, in the case where the thickness of a magnetic disk is merely reduced (thinned), a conventional magnetic disk is likely to be affected by the airflow caused by the rotation of the magnetic disk, thus making it difficult to reduce fluttering. Therefore, it is difficult to meet the demands for the reduction of the thickness of the conventional magnetic disk. On the other hand, in this embodiment, it is possible to stabilize the airflow around the outer circumferential end surface of the magnetic disk by reducing the change in the shape of the outer circumferential end surface in the circumferential direction of the glass substrate G, and therefore, it is possible to reduce fluttering even if the glass substrate G is thin. For example, it is preferable that the glass substrate G has a thickness T (see FIG. 1B) of nominally 0.635 mm or less because a significant effect can be obtained by using the structure of this embodiment. It should be noted that in the case where a glass substrate has a thickness of "nominally 0.635 mm", the case where the actual thickness is slightly larger or slightly smaller than 0.635 mm is included.

[Method for Manufacturing Magnetic-Disk Glass Substrate]

Hereinafter, a method for manufacturing the magnetic-disk glass substrate of this embodiment will be described for each step. It should be noted that the order of the steps may be changed as appropriate.

(1) Raw Glass Plate Molding and Rough Grinding Step

After forming a sheet of plate glass by, for example, a float method, a raw glass plate having a predetermined shape from which a magnetic-disk glass substrate is to be made is cut out from this sheet of plate glass. A raw glass plate may also be molded by, for example, pressing using an upper mold and a lower mold instead of the float method. It should be noted that the method for manufacturing a raw glass plate is not limited to these methods and a raw glass plate can also be manufactured by a known manufacturing method such as a down draw method, a redraw method or a fusion method.

It should be noted that rough grinding processing using loose abrasive particles may be performed on two main surfaces of the raw glass plate as needed.

(2) Circular Hole Forming Step

A circular hole is formed in the center of the raw glass plate using a cylindrical drill, and thus an annular raw glass plate is obtained. It should be noted that a circular hole may be formed by forming a circular cutting line on the surface of the raw glass plate using a diamond cutter or the like and by cutting the raw glass plate along the cutting line.

(3) Chamfering Step

After the circular hole forming step, a chamfering step of forming chamfered surfaces at the end portions (outer circumferential end portion and inner circumferential end portion) is performed. The chamfering step can be performed using a conventionally known device and method, and may be performed using, for example, a rotating formed grindstone while supplying a grinding liquid to a portion subjected to grinding processing. A groove may be formed in advance on the surface of the formed grindstone so as to obtain the end portions having desired shapes after the processing. In the chamfering step, first, rough grinding is performed on the outer circumferential end portion and the inner circumferential end portion of the annular raw glass plate using a relatively rough-grit diamond grindstone or the like, and thus chamfered shapes are formed at a relatively high speed. Next, final grinding is performed on the chamfered surfaces using a grindstone that has a low polishing rate and does not damage the surfaces of the end portions, such as a relatively fine-grit diamond grindstone, so as to have surface properties approaching a mirror surface. At this time, grinding processing is performed by rotating both the raw glass plate and the grindstone and bringing them into contact with each other, thus forming the shape of the raw glass plate in the circumferential direction.

Here, the surface roughness after the finishing can be made small by increasing the grit of the grindstone to be used in grinding processing (that is, by reducing the particle diameters of diamond abrasive particles), thus making it possible to reduce machining allowance in subsequent end surface polishing. As the machining allowance in the end surface polishing is smaller, the shape formed in the grinding step is retained, thus making it possible to enhance the shape accuracy. That is, it is possible to reduce the difference in the curvature radius between the neighboring measurement positions in the circumferential direction of the outer circumferential end portion.

(4) End Surface Polishing Step

Next, end surface polishing is performed on the annular raw glass plate. In the same manner as the chamfering step, the end surface polishing is performed by bringing the raw glass plate into contact with a polishing means while rotating the raw glass plate. Since no processing for grinding or polishing the end surfaces is performed after the end surface polishing, the end surface polishing plays an important role to substantially determine the final shape in the circumferential direction.

In the end surface polishing, a mass of a magnetic slurry is formed by holding the magnetic slurry along magnetic field lines, and this mass and the inner circumferential end surface and the outer circumferential end surface of the raw glass plate are brought into contact and moved relative to each other, and thus the inner circumferential end surface and the outer circumferential end surface of the glass substrate are polished. At this time, the side wall surfaces and the chamfered surfaces can be polished simultaneously. The magnetic slurry contains a magnetic viscous fluid and microparticles of cerium oxide, zirconium oxide, or the like as polishing abrasive particles. A fluid containing, for example, magnetic microparticles constituted by Fe and non-polar oil or polar oil is used as the magnetic viscous fluid. By polishing the end surfaces, contamination by attached waste and the like, and damage or impairment such as scratches on the end surfaces of the raw glass plate are eliminated, and therefore, it is possible to prevent thermal asperity and the deposition of ions such as sodium and potassium that causes corrosion. With the end surface polishing of this embodiment, extremely precise and high-quality processing is enabled compared with a conventional method for polishing end surfaces using a brush. Specifically, it is possible to significantly reduce the abnormality of the shape and to make surface roughness and waviness significantly small. In the case where brushing is performed, bristles are bent or broken due to the front end of a brush coming into contact with and following the work surface, and thus variability arises in the pressure that is applied when the front end of the brush comes into contact with the side wall surface or the chamfered surface. This causes partial deep polishing streaks, for example, and thus the shape accuracy of the end surface may be deteriorated. Also, in the same manner, a boundary portion between the side wall surface and the chamfered surface is non-uniformly ground in the circumferential direction, and thus the shape accuracy of the end surface may be deteriorated. It should be noted that the machining allowance in the end surface polishing step of the present invention can be greatly reduced compared with that in a conventional method using a brush, and the machining allowance can be set to, for example, 10 µm or less.

Here, the end surface polishing will be described in detail. FIGS. 3A to 3C and FIG. 4 are drawings illustrating an example of a polishing method in the end surface polishing of this embodiment.

Figure 3A:
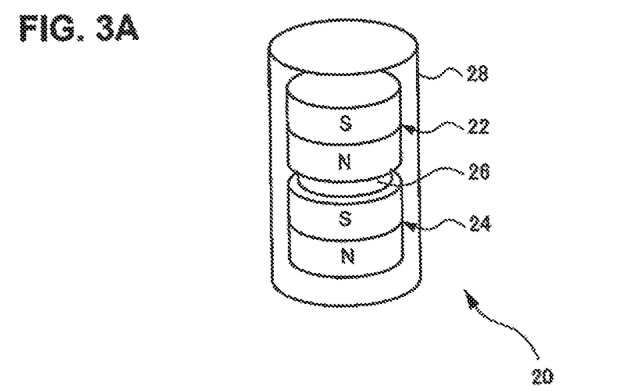
FIG. 3A is a drawing illustrating a method for polishing a glass substrate according to an embodiment.
Figure 4:
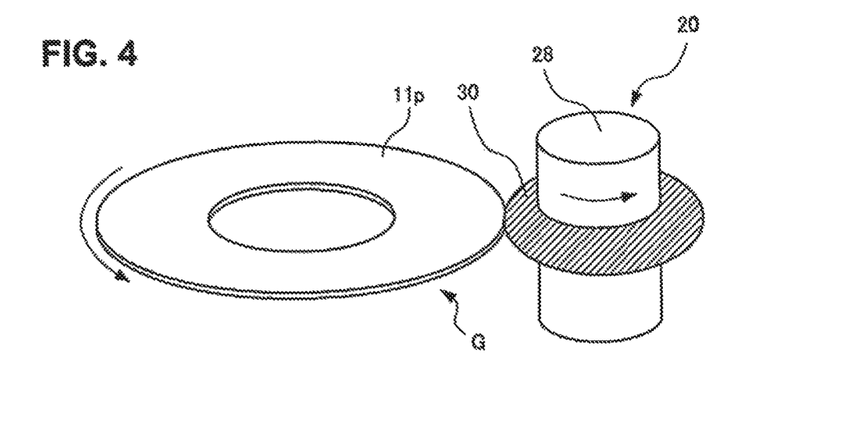
FIG. 4 is a drawing illustrating the method for polishing a glass substrate according to the embodiment.

An end surface polishing device 20 polishes the end surfaces of a glass substrate using a means for generating magnetism and a magnetic slurry. An outline of the end surface polishing device 20 will be described. As shown in FIG. 3A, the device 20 includes, for example, a pair of magnets 22 and 24, which are permanent magnets, a spacer 26, and a cylindrical pipe 28 made of a non-magnetic substance such as stainless steel. The magnets 22 and 24 and the spacer 26 are incorporated in the pipe 28. A raw glass plate whose end surfaces are to be polished is held by a holder (not shown). As shown in FIG. 4, the pipe 28 is disposed near the outer circumferential end surface of the raw glass plate. A mass 30 formed by the magnets 22 and 24 in this pipe 28 is brought into contact with the outer circumferential end surface of the raw glass plate. The holders (not shown) for holding the pipe 28 of the device 20 and the raw glass plate are mechanically connected to a driving motor (not shown). By rotating the pipe 28 and the holders to move the outer circumferential end surface of the raw glass plate and the mass 30 relative to each other, it is possible to polish the outer circumferential end surface of the raw glass plate. It should be noted that the end surfaces of the glass substrate and the mass 30 may be moved relative to each other by fixing the pipes 28 and the holders and rotating only the raw glass plate. It is sufficient to rotate the pipe 28 at 500 to 5000 rpm, for example. Moreover, it is sufficient to rotate the raw glass plate at 10 to 1000 rpm, for example. Although the pipe 28 and the raw glass plate may be rotated in the down-cutting direction or the up-cutting direction at the processing point, the down-cutting direction is more preferable because the polishing rate is low and the shape change very little. Moreover, it is preferable that the difference in a tangential velocity between the glass substrate and the magnetic slurry is set to 800 m/min or less in the case where the rotation is performed in each of the up-cutting direction and the down-cutting direction because it is possible to reduce the difference in the change in the shape in the circumferential direction between one surface and the other surface (difference between surface A and surface B, which will be described later).

Figure 3B:
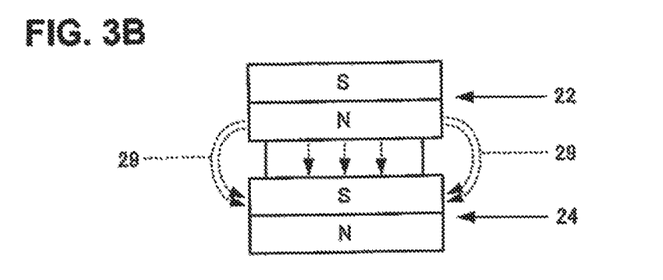
FIG. 3B is a drawing illustrating the method for polishing a glass substrate according to the embodiment.
Figure 3C:
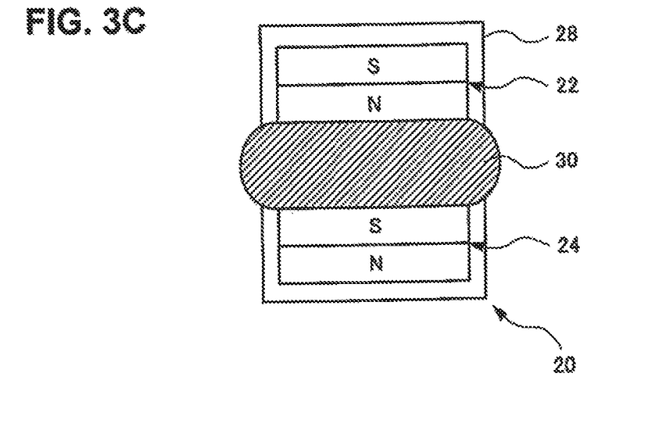
FIG. 3C is a drawing illustrating the method for polishing a glass substrate according to the embodiment.

The end surface polishing will be described more specifically. The magnet 22 and the magnet 24 are close to each other, serve as a magnetism generating means, and thus, as shown in FIG. 3B, form magnetic field lines 29 that extend from the magnet 22 to the magnet 24. The magnetic field lines 29 extend so as to project outward from the center between the magnets 22 and 24 and also extend in the thickness direction of the raw glass plate. The spacer 26 made of a non-magnetic substance is provided between the magnets 22 and 24 in order to, for example, form the mass 30 of magnetic slurry as shown in FIG. 3C around the outer circumference of the pipe 28.

Although it is sufficient that a magnetic flux density of the magnetism generating means is set so that the mass 30 of the magnetic slurry is formed, the magnetic flux density is preferably 0.1 to 10 tesla for the purpose of performing end surface polishing efficiently.

It should be noted that in the example shown in FIGS. 3A to 3C and FIG. 4, permanent magnets are used as the magnetism generating means, but electromagnets can also be used. Also, the magnets 22 and 24 can be fixed to the pipe 28 to ensure a constant distance between the end surface on the N-pole side of the magnet 22 and the end surface on the S-pole side of the magnet 24 without the spacer 26.

Known glass substrate polishing abrasive particles such as cerium oxide, colloidal silica, zirconium oxide, alumina abrasive particles, or diamond abrasive particles can be used as the polishing abrasive particles contained in the magnetic slurry. The polishing abrasive particles have the average particle diameter (D50) of, for example, 0.5 to 10 µm. Using the polishing abrasive particles having a particle diameter within this range makes it possible to favorably polish the inner end surface of the raw glass plate. The polishing abrasive particles are contained in the magnetic slurry in an amount of, for example, 1 to 20 vol %. Here, the average particle diameter (D50) means a particle diameter at which the cumulative volume frequency calculated in volume percentage in ascending order from small to large particle diameters reaches 50%.

(5) Precision Grinding Step

In a precision grinding step, the main surfaces of the annular raw glass plate are ground with a grindstone having fixed abrasive particles using a double-side grinding device provided with a planetary gear mechanism. For example, a grinding pad to which diamond abrasive particles are fixed by a resin can be used as the grindstone having fixed abrasive particles. The double-side grinding device has a pair of upper and lower surface plates (upper surface plate and lower surface plate) and the annular raw glass plate is held between the upper surface plate and the lower surface plate. The raw glass plate and the surface plates are moved relative to each other by moving one or both of the upper surface plate and the lower surface plate, so that the two main surfaces of the raw glass plate can be ground.

(6) First Polishing (Main Surface Polishing) Step

Next, first polishing is performed on the ground main surfaces of the glass substrate. In the first polishing step, the double-side polishing device provided with a planetary gear mechanism is used. In this polishing device, planar polishing pads having an annular shape as a whole are attached to the upper surface of the lower surface plate and the bottom surface of the upper surface plate. During operation of the planetary gear mechanism, the polishing pads are pressed against the raw glass plate mounted to a carrier and a polishing liquid is supplied between the raw glass plate and the polishing pads. One example of a material for the polishing pad is urethane foam. A polishing liquid containing, for example, cerium oxide or zirconium oxide is used as the polishing liquid.

(7) Chemical Strengthening Step

Next, the glass substrate on which the first polishing step has been performed is chemically strengthened.

For example, a mixed liquid of melts of potassium nitrate and sodium sulfate can be used as a chemical strengthening liquid. The chemical strengthening is performed by immersing the raw glass plate in the chemical strengthening liquid.

(8) Second Polishing (Final Polishing) Step

Next, second polishing is performed on the raw glass plate that has been chemically strengthened and sufficiently cleaned. In the second polishing, for example, a polishing device similar to the polishing device used in the first polishing is used. In this case, the second polishing differs from the first polishing in the type and size of loose abrasive particles and the hardness of a resin polisher.

For example, microparticles of colloidal silica (particle size: diameter of about 10 to 50 nm) are used as the loose abrasive particles to be used in the second polishing. The polished raw glass plate is cleaned to provide a magnetic-disk glass substrate.

[Magnetic Disk]

A magnetic disk can be obtained as follows using the magnetic-disk glass substrate.

A magnetic disk has a configuration in which, for example, at least an attaching layer, a base layer, a magnetic layer (magnetic recording layer), a protecting layer and a lubricant layer are laminated on the main surface of the magnetic-disk glass substrate (referred to as merely "substrate" hereinafter) in this order from the side of the main surface.

For example, the substrate is introduced into a film deposition device that has been evacuated and the layers from the attaching layer to the magnetic layer are sequentially formed on the main surface of the substrate in an Ar atmosphere by a DC magnetron sputtering method. For example, CrTi can be used in the attaching layer and CrRu can be used in the base layer. A CoPt based alloy can be used in the magnetic recording layer. Also, a CoPt-based alloy or a FePt-based alloy having an $L_{10}$ ordered structure is formed to be the magnetic layer for thermally assisted magnetic recording. After the film deposition as described above, by forming the protecting layer using $C_2H_4$ by, for example, a CVD method and subsequently performing nitriding processing that introduces nitrogen to the surface, a magnetic recording medium can be formed. Thereafter, by coating the protecting layer with perfluoropolyether (PFPE) by a dip coat method, the lubricant layer can be formed.

The produced magnetic disk is preferably incorporated in a magnetic-disk drive device (hard disk drive (HDD)) serving as a magnetic recording and reproduction device provided with a magnetic head equipped with a dynamic flying height (DFH) control mechanism and a spindle for fixing the magnetic disk.

WORKING EXAMPLES AND COMPARATIVE EXAMPLES

In order to confirm the effect of the magnetic-disk glass substrate according to this embodiment, a magnetic-disk glass substrate having a nominal diameter of 2.5 inches and a central value of the thickness of 0.635 mm (having an outer diameter of 65 mm, an inner diameter of 20 mm, and a thickness of 0.635 mm) was produced, and a magnetic disk was manufactured.

Working Example 1

A magnetic-disk glass substrate of Working Example 1 was produced by performing the steps of the above-described method for manufacturing a magnetic-disk glass substrate according to this embodiment in the given order.

Here, the pressing method was used in molding of a raw glass plate in step (1), and then the raw glass plate was subjected to rough grinding using loose abrasive particles.

In the circular hole forming step in step (2), a circular hole was formed in the center of the raw glass plate using a cylindrical drill.

In the chamfering in step (3), rough grinding for forming chamfered surfaces was performed using a 400 #diamond grindstone. Thereafter, final grinding was performed on the chamfered surfaces using a 2000 #diamond grindstone. It should be noted that the shape of the chamfered portion was formed such that both θ1 and θ2 (see FIG. 1C) were 45 degrees. Moreover, the distance D1 shown in FIG. 1C was 0.15 mm and the distance D2 was 0.15 mm. It should be noted that all of the chamfered portions on the front side and back side of the inner circumferential side and the outer circumferential side had the same shape.

In the end surface polishing in step (4), end surface polishing using the above-described magnetic slurry was performed. The magnetic slurry obtained by dispersing cerium oxide as polishing abrasive particles in a magnetic fluid obtained by dispersing Fe microparticles in non-polar oil was used as the magnetic slurry. Permanent magnets were used as the magnets. Processing was performed in the up-cutting direction. It should be noted that the machining allowance of the chamfered surfaces was 10 μm in step (4).

In the grinding using fixed abrasive particles in step (5), grinding was performed using a grinding device in which a grinding pad to which diamond abrasive particles were fixed by a resin and that was to be used as a grindstone having fixed abrasive particles was attached to a surface plate.

In the first polishing in step (6), a polishing liquid containing cerium oxide abrasive particles was used, and a hard urethane pad was used as the polishing pad.

In the chemical strengthening in step (7), the raw glass plate was immersed in a mixed liquid of melts of potassium nitrate and sodium nitrate as a chemical strengthening liquid.

In the second polishing in step (8), a polishing liquid containing colloidal silica microparticles as abrasives was used. Thereafter, the raw glass plate was cleaned, and a magnetic-disk glass substrate was obtained.

Working Example 2

A magnetic-disk glass substrate was manufactured in the same manner as in Working Example 1, except that the machining allowance was set to 8 μm in the end surface polishing in step (4).

Working Example 3

A magnetic-disk glass substrate was manufactured in the same manner as in Working Example 2, except that rough grinding was performed using a 500 #diamond grindstone and final grinding was performed using a 3000 #diamond grindstone in the chamfering step in step (3), and that the machining allowance was set to 8 μm in the end surface polishing in step (4).

Working Example 4

A magnetic-disk glass substrate was manufactured in the same manner as in Working Example 3, except that the machining allowance was set to 5 μm in the end surface polishing in step (4).

Working Example 5

A magnetic-disk glass substrate was manufactured in the same manner as in Working Example 3, except that the magnets and the raw glass plate were rotated in the down-cutting direction at the processing point in the end surface polishing in step (4).

Working Example 6

A magnetic-disk glass substrate was manufactured in the same manner as in Working Example 5, except that the machining allowance was set to 8 μm in the end surface polishing in step (4).

Working Example 7

A magnetic-disk glass substrate was manufactured in the same manner as in Working Example 5, except that the machining allowance was set to 4 μm in the end surface polishing in step (4).

Comparative Example 1

On the other hand, in Comparative Example 1, rough grinding for forming chamfered surfaces was performed using a 400 #diamond grindstone in the chamfering in step (3). It should be noted that final grinding was not performed on the comparative example 1.

In addition, in the end surface polishing in step (4), the end surfaces of the raw glass plate were polished with a polishing brush using cerium oxide as loose abrasive particles. The machining allowance of the chamfered surfaces was 50 μm in step (4).

Comparative Example 2

A magnetic-disk glass substrate was manufactured in the same manner as in Comparative Example 1, except that rough grinding was performed using a 500 #diamond grindstone and final grinding was performed using a 3000 #diamond grindstone in the chamfering in step (3), and that the machining allowance of the chamfered surfaces was set to 30 μm in the brushing in step (4).

Next, in each of the working examples and comparative examples, measurement points were provided every 30 degrees in the circumferential direction of the main surface with reference to the center of the main surface, and the curvature radius of the shape of the portion between the side wall surface and the chamfered surface was determined at each measurement point. It should be noted that the measurement was performed on twenty-four points in total, consisting of twelve points on the front surface side and twelve points on the back surface side, in the outer circumferential end portion of each glass substrate selected from the working examples and comparative examples. The differences in the curvature radius between the neighboring measurement points of the twelve points on the front surface side (twelve pieces of data) and the differences in the curvature radius between the neighboring measurement points of the twelve points on the back surface side (twelve pieces of data) were determined, and the maximum value among the twenty-four pieces of data in total was considered as the maximum value of the curvature radius of the corresponding working example or comparative example. Moreover, the second curvature radius of the portion between the chamfered surface and the main surface was determined in the same manner, which will be described later. Table 1 shows a portion of the measurement data (Comparative Examples 1 and 2 and Working Examples 1 and 3). In Table 1, the front surface and the back surface of the glass substrate to be measured are respectively represented as surface A and surface B. Moreover, in Table 1, the difference in the curvature radius of, for example, "0 to 30°" means an absolute value of the difference between the curvature radius at the measurement point at 0 degree and the curvature radius at the measurement point at 30 degrees. Furthermore, for example, the position at 30 degrees on surface B was disposed on the back side of the position at 30 degrees on surface A.

TABLE 1

| | Difference in curvature radius (mm) | | | | | | | |
|---|---|---|---|---|---|---|---|---|
| | Work. Ex. 1 | | Work. Ex. 2 | | Comp. Ex. 1 | | Comp. Ex. 2 | |
| | Surface A | Surface B | Surface A | Surface B | Surface A | Surface B | Surface A | Surface B |
| 0 to 30° | 0.005 | 0.009 | 0.001 | 0.004 | 0.010 | 0.001 | 0.010 | 0.001 |
| 30 to 60° | 0.004 | 0.007 | 0.001 | 0.004 | 0.013 | 0.001 | 0.003 | 0.001 |
| 60 to 90° | 0.005 | 0.007 | 0.002 | 0.005 | 0.020 | 0.007 | 0.001 | 0.002 |
| 90 to 120° | 0.003 | 0.008 | 0.003 | 0.003 | 0.004 | 0.007 | 0.012 | 0.003 |
| 120 to 150° | 0.003 | 0.007 | 0.005 | 0.001 | 0.013 | 0.001 | 0.009 | 0.005 |

TABLE 1-continued

| | Difference in curvature radius (mm) | | | | | | | |
|---|---|---|---|---|---|---|---|---|
| | Work. Ex. 1 | | Work. Ex. 2 | | Comp. Ex. 1 | | Comp. Ex. 2 | |
| | Surface A | Surface B | Surface A | Surface B | Surface A | Surface B | Surface A | Surface B |
| 150 to 180° | 0.003 | 0.006 | 0.005 | 0.004 | 0.005 | 0.015 | 0.000 | 0.007 |
| 180 to 210° | 0.005 | 0.006 | 0.003 | 0.003 | 0.010 | 0.015 | 0.003 | 0.011 |
| 210 to 240° | 0.005 | 0.006 | 0.002 | 0.004 | 0.012 | 0.016 | 0.010 | 0.010 |
| 240 to 270° | 0.004 | 0.007 | 0.001 | 0.003 | 0.011 | 0.016 | 0.009 | 0.001 |
| 270 to 300° | 0.005 | 0.009 | 0.004 | 0.002 | 0.009 | 0.002 | 0.011 | 0.004 |
| 300 to 330° | 0.005 | 0.009 | 0.002 | 0.001 | 0.003 | 0.002 | 0.004 | 0.002 |
| 330 to 360° | 0.002 | 0.010 | 0.003 | 0.002 | 0.002 | 0.002 | 0.004 | 0.003 |
| Maximum value of difference | 0.010 | | 0.005 | | 0.020 | | 0.012 | |

A magnetic disk was produced by forming a magnetic layer on the obtained magnetic-disk glass substrate. Thereafter, fluttering was evaluated for each magnetic disk of the working examples and comparative examples using a laser Doppler vibrometer. To evaluate fluttering, first, the magnetic disk was attached to the spindle of a hard disk drive (HDD) having a rotation rate of 7200 rpm, and the main surface of the rotating magnetic disk was irradiated with a laser beam from a laser Doppler vibrometer. Next, the laser Doppler vibrometer received the laser beam reflected by the magnetic disk, and thus the vibration value in the thickness direction of the magnetic disk was obtained.

The following is more specific description.

In the measurement of the fluttering characteristic value, a magnetic disk was attached to the spindle of a 2.5-inch type HDD and was rotated, and the main surface of the rotating magnetic disk was irradiated with a laser beam from a laser Doppler vibrometer. It should be noted that the HDD was properly equipped with a cover so as not to be affected by outside air, and the cover of the HDD was provided with a hole for laser beam irradiation. Next, the laser Doppler vibrometer received the laser beam reflected by the magnetic disk, and thus the amount of vibration in the thickness direction of the magnetic disk was measured as a fluttering characteristic value. In this case, the fluttering characteristic values were measured under the following conditions.

Environment for HDD and measurement system: The temperature was kept at 25° C. in a constant temperature and humidity chamber.

Rotation rate of magnetic disk: 7200 rpm

Laser beam irradiation position: Position 31 mm apart from the center (1.5 mm apart from the outer circumferential end) of a magnetic disk in the radial direction Minimum value of diameter of inner wall of disk-attaching portion in HDD housing: 65.880 mm

[Evaluation Criterion]

The results of evaluation of the measured fluttering characteristic values were divided to four levels, Levels 1 to 4, in descending order of favorability (that is, in increasing order of the fluttering characteristic value). Levels 1 and 2 are acceptable for practical purposes. Tables 2 and 3 show the results.

Level 1: 20 nm or less
Level 2: more than 20 nm to 30 nm or less
Level 3: more than 30 nm to 40 nm or less
Level 4: more than 40 nm

TABLE 2

| | Maximum value of difference in curvature radius (mm) | Evaluation of fluttering |
|---|---|---|
| Comp. Ex. 1 | 0.020 | Level 4 |
| Comp. Ex. 2 | 0.012 | Level 4 |
| Work. Ex. 1 | 0.010 | Level 2 |
| Work. Ex. 2 | 0.008 | Level 2 |
| Work. Ex. 3 | 0.005 | Level 1 |
| Work. Ex. 4 | 0.003 | Level 1 |

TABLE 3

| | Maximum value of difference in second curvature radius (mm) | Evaluation of fluttering |
|---|---|---|
| Work. Ex. 1 | 0.006 | Level 2 |
| Work. Ex. 5 | 0.005 | Level 2 |
| Work. Ex. 6 | 0.004 | Level 1 |
| Work. Ex. 7 | 0.002 | Level 1 |

As shown in Table 2, in the case where the difference in the curvature radius between the neighboring measurement points was 0.01 mm or less, favorable evaluation was obtained. It is found from these results that the reduction of the change in the shape of the outer circumferential end surface in the circumferential direction of the glass substrate makes it possible to further reduce fluttering at a high rotation speed. Moreover, as shown in Table 2, in the case where the difference in the curvature radius between the neighboring measurement points was 0.005 mm or less, even more favorable evaluation was obtained compared with the case where the difference was 0.01 mm or less.

It should be noted that in Comparative Examples 1 and 2, when the curvature radius was measured every 40 degrees in the circumferential direction and the maximum value of the difference in the curvature radius between the neighboring measurement points was determined in the same manner as described above, the maximum values of both comparative examples were 0.01 mm or less. Also, in the case where the curvature radius was measured every 60 degrees, the maximum values of both comparative examples were 0.01 mm or less. Accordingly, it was revealed that the measurement every 30 degrees was important. That is, it is assumed that the measurement every 30 degrees made it possible to detect changes in the shape of the end portions during a short cycle and thus a correlation with fluttering was obtained. With the present Invention, by performing the end surface polishing using a magnetic slurry, it is possible to suppress abnormality of the shape of the end portions in the circumferential direction that occurs in the case where the end portions are polished using a brush, thus making it possible to reduce fluttering.

Table 3 shows the evaluation results in the case where the differences in the curvature radius between the neighboring measurement points are 0.01 mm or less and the maximum values of the differences in the second curvature radius between the neighboring measurement points are different. It should be noted that fluttering was evaluated in the same manner as described above, except that a 2.5-inch HDD having a rotation rate of 10000 rpm was used. As shown in Table 3, in the case where the difference in the second curvature radius between the neighboring measurement points was 0.004 mm or less, more favorable evaluation was obtained.

[Evaluation with Different Glass Composition]

Next, in order to further confirm the effect of the method for manufacturing a magnetic-disk glass substrate according to this embodiment, a 2.5-inch magnetic disk was produced from a magnetic-disk glass substrate that had glass composition 2 different from the above-described glass composition 1 (Working Example 8). The method for producing a magnetic-disk glass substrate is the same as the case where glass has glass composition 1 (that is, the above-described steps (1) to (8)). It should be noted that glass composition 2 is preferably for a composition of glass to be used in a magnetic-disk glass substrate to be used in a magnetic disk for energy-assisted magnetic recording.

In Working Example 8, at measurement points provided every 30 degrees in the circumferential direction of the main surface with reference to the center of the main surface, the curvature radius of the shape of the portion between the side wall surface and the chamfered surface was determined at each measurement point. As in Working Example 1, the maximum value of the difference in the curvature radius between the neighboring measurement points was 0.01 mm.

Next, when fluttering of Working Example 8 was evaluated, a favorable result was obtained as in Working Example 1.

Next, in order to further confirm the effect of the method for manufacturing a magnetic-disk glass substrate according to this embodiment, 2.5-inch magnetic disks were produced from magnetic-disk glass substrates having different thicknesses.

[Evaluation with Different Thickness]

Magnetic-disk glass substrates were manufactured in the same manner as in Working Example 1 and Comparative Example 1, except that a central value of thickness was 0.500 mm, and magnetic disks were obtained by forming films on these magnetic-disk glass substrates (Working Example 9 and Comparative Example 3, respectively).

Moreover, magnetic-disk glass substrates were manufactured in the same manner as in Working Example 1 and Comparative Example 1, except that a central value of thickness was 0.800 mm, and magnetic disks were obtained by forming films on these magnetic-disk glass substrates (Working Example 10 and Comparative Example 4, respectively).

Furthermore, magnetic-disk glass substrates were manufactured in the same manner as in Working Example 1 and Comparative Example 1, except that a central value of thickness was 1.000 mm, and magnetic disks were obtained by forming films on these magnetic-disk glass substrates (Working Example 11 and Comparative Example 5, respectively).

When the maximum value of the curvature radius of the outer circumferential end surface was evaluated, those of Working Examples 9, 10 and 11 were the same as that of Working Example 1, and those of Comparative Examples 3, 4 and 5 were the same as that of Comparative Example 1.

Fluttering of each magnetic disk of Working Examples 1, 9, 10 and 11 and Comparative Examples 1, 3, 4 and 5 was evaluated in the same manner as described above, except that a 2.5 inch HDD having a rotation rate of 5400 rpm was used. The improved widths in the fluttering characteristic values between working examples and comparative examples having the same thickness (values obtained by subtracting the fluttering characteristic value of the working example from the fluttering characteristic value of the comparative example) that were determined are as follows.

Improved width when thickness was 1.000 mm: 2.6 nm
Improved width when thickness was 0.800 mm: 5.0 nm
Improved width when thickness was 0.635 mm: 10.0 nm
Improved width when thickness was 0.500 mm: 20.5 nm It is confirmed from the above-described results that the present invention exhibits a particularly large improved effect in the case where the thickness is 0.635 mm or less.

Next, the relationship between fluttering and the difference between surface A and surface B in the difference in curvature radius between the neighboring points was examined. Specifically, the average values of the difference in curvature radius between the neighboring points of surface A and surface B were determined, and the difference between surface A and surface B ($\Delta R$) was obtained in an absolute value by determining the difference between the average value in surface A and the average value in surface B. $\Delta R$ was changed by controlling the tangential velocity at the processing point during the end surface polishing based on the manufacturing conditions of Working Example 1. The difference in the tangential velocity was set to 800 m/min or less in Working Examples 12 and 13, and to more than 800 m/min in Working Examples 14 and 15.

Moreover, fluttering was evaluated in the same manner as described above, except that a 2.5 inch HDD having a rotation rate of 15000 rpm was used. It should be noted that this evaluation was purposely performed under very severe conditions, and therefore, there is no problem in practical terms even at Level 3.

As a result of evaluation, it was found that setting $\Delta R$ to 0.003 mm or less makes the fluttering characteristics when the magnetic disk is rotated at an ultrahigh rotation speed even more favorable. It was found from this fact that it is important that surface A and surface B have a similar value of the difference in curvature radius between the neighboring points in the circumferential direction when the magnetic disk is rotated at an ultrahigh rotation speed.

TABLE 4

|  | $\Delta R$ (mm) | Evaluation of fluttering |
| --- | --- | --- |
| Work. Ex. 12 | 0.002 | Level 2 |
| Work. Ex. 13 | 0.003 | Level 2 |
| Work. Ex. 14 | 0.004 | Level 3 |
| Work. Ex. 15 | 0.005 | Level 3 |

While the magnetic-disk glass substrate and magnetic disk according to the present invention has been described in detail, the present invention is not limited to the above-described embodiment, and it will be appreciated that various improvements and modifications can be made without departing from the concept of the present invention.

According to a first aspect of the embodiment is a doughnut-shaped magnetic-disk glass substrate having a circular hole provided in the center, a pair of main surfaces, and an outer circumferential end surface and an inner circumferential end surface each including a side wall surface and a chamfered surface that is formed between each main surface and the side wall surface, wherein a measurement point is provided on the outer circumferential end surface every 30 degrees in the circumferential direction with reference to a center of the glass substrate, and when a curvature radius of a shape of a portion between the side wall surface and the chamfered surface is determined at each measurement point, a difference in the curvature radius between neighboring measurement points is 0.01 mm or less.

In the magnetic-disk glass substrate, it is preferable that the difference in the curvature radius between neighboring measurement points is 0.005 mm or less. In the magnetic-disk glass substrate, it is preferable that a measurement point is provided every 30 degrees in the circumferential direction with reference to the center of the glass substrate, and when a curvature radius of a shape of a portion between the main surface and the chamfered surface is determined at each measurement point as a second curvature radius, a difference in the second curvature radius between neighboring measurement points is 0.004 mm or less. In the magnetic-disk glass substrate, it is preferable that the glass substrate has a thickness of 0.635 mm or less.

A second aspect of the embodiment is a magnetic disk in which at least a magnetic layer is formed on the above-described magnetic-disk glass substrate.

With a magnetic-disk glass substrate and a magnetic disk according to the present invention, it is possible to further reduce fluttering at a high rotation speed.

What is claimed is:

1. A hard disk drive comprising:
a doughnut-shaped magnetic-disk substrate having a circular hole provided in the center, the doughnut-shaped magnetic-disk substrate including
a pair of main surfaces, and
an outer circumferential end surface and an inner circumferential end surface each including a side wall surface and a chamfered surface that is formed between each main surface and the side wall surface; and
a magnetic head,
a measurement point being provided on the outer circumferential end surface every 30 degrees in the circumferential direction with reference to a center of the substrate, and when a curvature radius of a shape of a portion between the side wall surface and the chamfered surface is determined at each measurement point, a difference in the curvature radius between neighboring measurement points being 0.01 mm or less,
a magnetic layer being formed on a surface of the substrate.

2. The hard disk drive according to claim 1, wherein the difference in the curvature radius between neighboring measurement points is 0.005 mm or less.

3. The hard disk drive according to claim 1, wherein a measurement point is provided every 30 degrees in the circumferential direction with reference to the center of the substrate, and when a curvature radius of a shape of a portion between the main surface and the chamfered surface is determined at each measurement point as a second curvature radius, a difference in the second curvature radius between neighboring measurement points is 0.004 mm or less.

4. The hard disk drive according to claim 1, wherein the substrate has a thickness of 0.635 mm or less.

5. The hard disk drive according to claim 1, wherein the substrate has a thickness of 0.500 mm or less.

6. The hard disk drive according to claim 5, wherein the substrate is made of glass.

7. The hard disk drive according to claim 1, wherein the substrate is configured as a substrate of a magnetic disk for energy-assisted magnetic recording.

8. The hard disk drive according to claim 7, wherein the substrate is made of glass.

9. The hard disk drive according to claim 1, wherein the substrate is made of glass.

10. The hard disk drive according to claim 1, wherein the pair of main surfaces includes a surface A and a surface B, and
a measurement point is provided on the outer circumferential end surface every 30 degrees in the circumferential direction with reference to the center of the main surfaces of the substrate, and when average values of difference in curvature radius of a shape of a portion between the side wall surface and the chamfered surface between neighboring measurement points are determined for the surface A and the surface B and a difference between the average value of the surface A and the average value of the surface B is obtained in an absolute value as ΔR, the ΔR is 0.003 mm or less.

11. The hard disk drive according to claim 10, wherein the substrate is made of glass.

12. A hard disk drive comprising:
a magnetic-disk substrate having a circular hole provided in the center, the magnetic-disk substrate including
a pair of main surfaces that includes a surface A and a surface B, and
an outer circumferential end surface and an inner circumferential end surface each including a side wall surface and a chamfered surface that is formed between each main surface and the side wall surface; and
a magnetic head,
a measurement point being provided on the outer circumferential end surface every 30 degrees in the circumferential direction with reference to a center of the main surfaces of the magnetic-disk substrate, and when average values of difference in curvature radius of a shape of a portion between the side wall surface and the chamfered surface between neighboring measurement points are determined for the surface A and the surface B and a difference between the average value of the surface A and the average value of the surface B is obtained in an absolute value as ΔR, the ΔR being 0.003 mm or less,
a magnetic layer being formed on a surface of the magnetic-disk substrate.

13. The hard disk drive according to claim 12, wherein the difference in the curvature radius between neighboring measurement points is 0.005 mm or less.

14. The hard disk drive according to claim 12, wherein a measurement point is provided every 30 degrees in the circumferential direction with reference to the center of the magnetic-disk substrate, and when a curvature radius of a shape of a portion between the main surface and the chamfered surface is determined at each measurement point as a second curvature radius, a difference in the second curvature radius between neighboring measurement points is 0.004 mm or less.

15. The hard disk drive according to claim 12, wherein the magnetic-disk substrate has a thickness of 0.635 mm or less.

16. The hard disk drive according to claim 12, wherein the magnetic-disk substrate has a thickness of 0.500 mm or less.

17. The hard disk drive according to claim 16, wherein the magnetic-disk substrate is made of glass.

18. The hard disk drive according to claim 12, wherein the magnetic-disk substrate is configured as a substrate of a magnetic disk for energy-assisted magnetic recording.

19. The hard disk drive according to claim 18, wherein the magnetic-disk substrate is made of glass.

20. The hard disk drive according to claim 12, wherein the magnetic-disk substrate is made of glass.

\* \* \* \* \*